United States Patent [19]
Caferro

[11] Patent Number: 5,301,465
[45] Date of Patent: Apr. 12, 1994

[54] PLANTER, AND PROCESSES FOR CONSTRUCTION THEREOF AND PLANTING THEREIN

[76] Inventor: Dennis Caferro, E. 508 Augusta Ave., Spokane, Wash. 99207

[21] Appl. No.: 903,085

[22] Filed: Jun. 18, 1992

[51] Int. Cl.$^5$ .............................. A01G 9/02
[52] U.S. Cl. ............................................ 47/66
[58] Field of Search .................. 47/66, 85, 73; 29/513

[56] References Cited

U.S. PATENT DOCUMENTS

| 465,916 | 12/1891 | Bonnaffon | 29/513 |
|---|---|---|---|
| 2,722,625 | 11/1955 | Bingeman et al. | 29/513 |
| 4,442,628 | 4/1984 | Whitcomb . | |
| 4,442,629 | 4/1984 | Anderson | 47/71 |
| 4,497,132 | 2/1985 | Whitcomb . | |
| 4,534,130 | 8/1985 | Rogers | 47/66 |
| 4,716,680 | 1/1988 | Whitcomb . | |
| 4,753,219 | 6/1988 | Caferro . | |
| 4,850,136 | 7/1989 | Vollers . | |
| 4,937,973 | 7/1990 | Schilling | 47/66 |
| 4,939,865 | 7/1990 | Whitcomb et al. | 47/66 |
| 5,099,607 | 3/1992 | Lawton | 47/66 |

FOREIGN PATENT DOCUMENTS

| 30112 | of 0000 | Fed. Rep. of Germany . |
| 60174 | of 0000 | Fed. Rep. of Germany . |
| 2744143 | of 0000 | Fed. Rep. of Germany . |
| 2238422 | of 0000 | France . |

OTHER PUBLICATIONS

Floralware brochure, dated Sep. 27, 1979.

Primary Examiner—Ramon S. Britts
Assistant Examiner—Joanne C. Downs
Attorney, Agent, or Firm—Wells, St. John, Roberts, Gregory & Matkin

[57] ABSTRACT

A planter grid wall is formed by intersecting groups of metal strips, joined together and spaced apart to form a network of open cells. The strips have equal dimensions, with inner edges defining the open ended chamber of the planter, and outer edges defining the planter periphery. The distances between the inner and outer edges is at least one half the size of the cells to facilitate retention of growing medium within the planter. Yet the open cells permit the process steps of aeration of the planting medium and "air pruning" of roots that grow into the cells and out into contact with the surrounding ambient atmosphere. The inner edges also include abrupt sharp corners that engage and mechanically prune the roots, thereby avoiding spiral root growth and encouraging growth of short new root ends. A reflective, insulative coating on the strips aid heating of the plant medium by reflection and prevent conductive and convective heat loss through the strips at night time or in cold conditions.

4 Claims, 9 Drawing Sheets

PLANTER, AND PROCESSES FOR CONSTRUCTION THEREOF AND PLANTING THEREIN

TECHNICAL FIELD

The present invention relates to planter construction and planter growing processes in general and more particularly to a process for constructing a planter with an open cellular wall, the planter with such wall construction, and growing processes using the planter with such wall construction.

BACKGROUND OF THE INVENTION

Potted plants often become "root bound" due to incorrect pot size, or simply due to growth of the plant and the confining nature of the pot walls. To eliminate this problem, larger pots are used, or the plant contained within the pot is transplanted into the ground. The difficulty found in transplanting is that spiral growth of roots may continue in the ground, at least temporarily, thereby reducing potential plant performance, especially in short growing seasons.

It has been found that roots take up nutrients only in the first 2 millimeters of the root tips, so it is important that a root system sprout as many small roots as possible. One avenue for obtaining a maximum number of root tips is accomplished by pruning the roots. Of course this procedure is not readily available to a plant growing naturally in the ground.

Mechanical pruning has been accomplished to a limited degree within specially designed planters. U.S. Pat. Nos. 4,442,628; 4,497,132; and 4,716,680 all issued to Whitcomb disclose growth containers which, in some way, are provided to prune roots, either mechanically or by "air pruning." The '680 patent is a mechanical root pruning device with no provision for aeration.

"Air pruning" is a method by which roots may be "pruned" by exposing portions of the root stems to ambient air. Roots exposed to open air abruptly stop growing. Retarded growth in the area influences new root growth in other areas, thereby producing an effect similar to mechanical pruning. Hundreds of secondary or auxiliary roots sprout in place of the "air pruned" root ends. These secondary roots take up nutrients and promote better plant life.

It is advantageous to provide both mechanical and air root pruning while avoiding spiral root growth to maximize the growth and productivity of plants.

German Patent 2,744,143 shows a plant receptacle having a wall configuration with a number of circular apertures formed in the side for permitting outward expansion of roots. The receptacle wall appears to be continuous. The apertures are circular and spaced apart from one another to leave a substantial surface area of the receptacle walls in contact with the planting medium. The circular areas occupied by the apertures and the wall thickness appear to limit air and mechanical pruning by the structure. Furthermore, the circular nature of the apertures, even the flared apertures shown in FIG. 3b of the reference, would not encourage significant soil warming due to reflected sunlight on the aperture surfaces.

French Patent 2,238,422; German Patent 60,174; and German Patent 30,112 all disclose forms of plant arbors utilized to receive growing, above-ground foliage of a plant to hold fruit, blossoms, etc. above the ground surface to avoid spoilage. Of these, German Patent 60,174 discloses a thin apertured wall structure that is selectively based about the fruit plant stocks and is held by a tie wire or string. The apertures in this arrangement are utilized to allow light and air to the stalk and foliage growing therein.

U.S. Pat. No. 4,850,136 to Vollers shows a container with removable wall sections shaped in a rectangular configuration. The primary function of this container is to facilitate separation of the container walls from the root mass to facilitate transplanting.

The above-described apparatus achieve limited purposes in avoiding spiral root growth in some instances and facilitate plant growth or support in others. However, none specifically addresses both issues of air and mechanical root pruning and none facilitates planting within the vertical wall of the planter itself, thereby significantly expanding the planting surface of the planter.

BRIEF DESCRIPTION OF THE DRAWINGS

Preferred embodiments of the invention are described below with reference to the accompanying drawings, which are briefly described below.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 10:
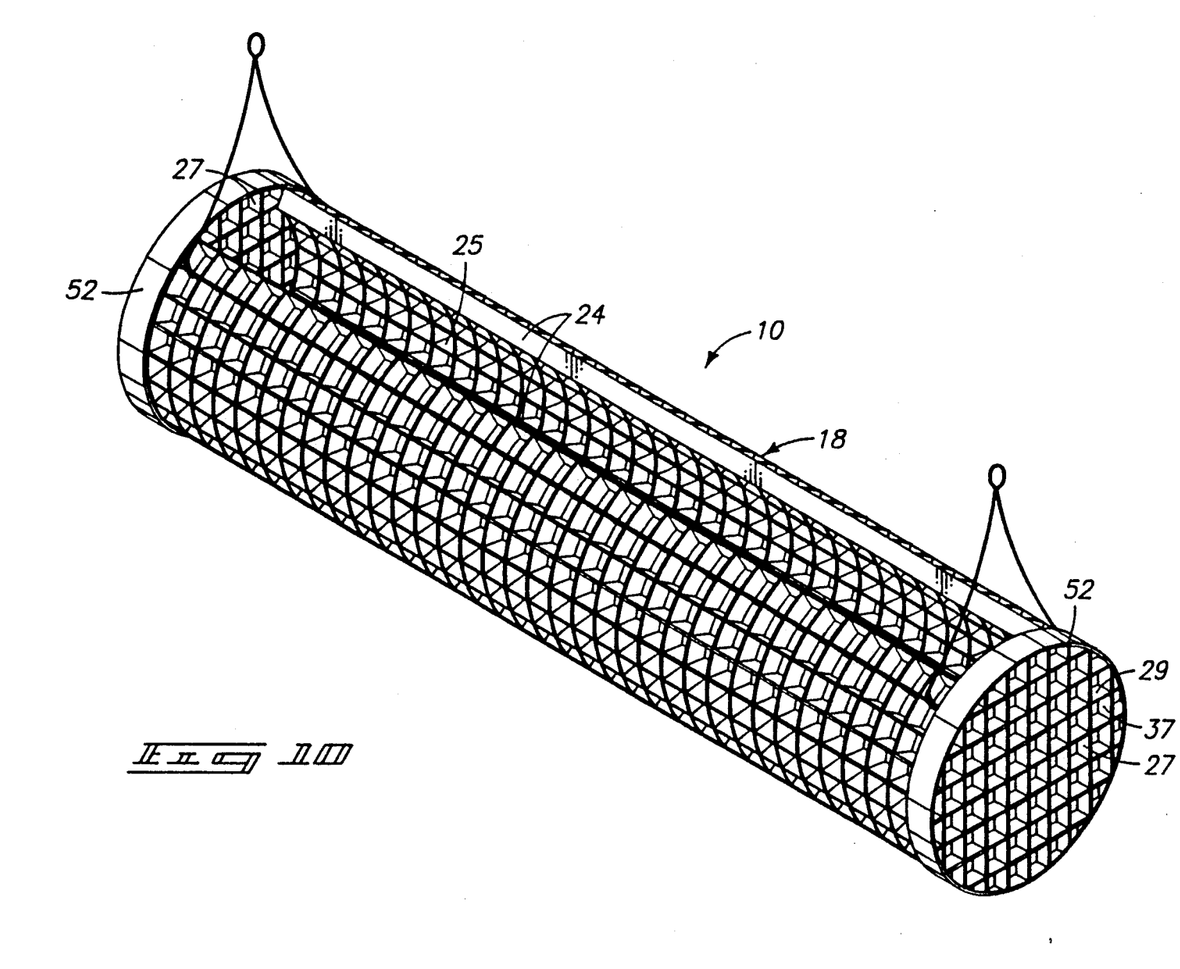
FIG. 10 is an alternative preferred embodiment of the present planter in a horizontal configuration.

Two examples of planters are generally designated in the drawings by the reference numeral 10. A first preferred example includes features of the present invention in an upright planter as shown in FIGS. 1-9. FIG. 10 shows another preferred example in which elements of the present invention are incorporated in a horizontal planter. The present process for producing the planter 10 is diagrammatically illustrated in FIGS. 11-16.

The present planter 10, incorporated in either exemplified form, serves several purposes in improving performance of plants 11 (FIG. 9), both in growth and production.

Firstly, the planters 10 will function to raise the temperature of planting medium 12 contained therein. This is done by exposing the planting medium to the sun through the open cellular structure of the present planter walls, and by reflection of the sun's rays off the cellular wall components. In addition to the warming function, the unique wall structure allows the root system 13 to "breathe".

The present planters 10 additionally contribute to improved plant growth and performance by their ability to effect two different root pruning functions on the plant roots 13. The roots are "mechanically" pruned as they approach and encounter sharp corner surfaces of the present planter wall structure.

The roots are also "air" pruned by facilitating growth of the roots 13 out to the ambient atmosphere where they naturally stop growing in length and are, in effect, pruned. This stops the growth of long bulky root stalks which would otherwise keep growing but which do not significantly promote growth of the entire plant. Growth of long root stalks in planters results in the stalks coiling within the planter, against the planter walls. This undesirable action is termed "spiral" root growth.

The result of both mechanical and air pruning processes provided for in the present invention is that undesirable spiral root growth is eliminated and, instead, a much more favorable action occurs when secondary or auxiliary roots sprout from the heavier stalks within the planter 10. These fine almost hair-like secondary roots are considered of vital importance as they, not the heavier root stalks, take up nutrients and promote more and better plant life.

The present planters also function to facilitate selective plant placement at locations on the planter walls in addition to the upward openings therein. Plants or seeds may be placed within the open cell structure of the planter walls. Thus the effective planting bed includes not only the obvious opening at the tops of the planters, but also the planter wall surfaces.

Referring now in greater detail to the drawings, it will be seen that the planters 10 each include a grid wall 18. The grid wall 18 is an open cellular structure including a matrix of individual open cells 19. The grid walls 18 may be formed into a substantially cylindrical configuration, as shown in the drawings. However, the grid walls 18 could also be formed in other closed curved or even polygonal configurations (not shown).

In the first preferred form, the grid wall 18 is upright and substantially cylindrical, extending about a closed perimeter and including at least one open end, preferably at the top 20. The wall 18 also extends to a bottom end 21. In the first preferred example shown, the bottom end 21 is also open, to be selectively covered or releasably received within a planter tray 53.

Figure 1:
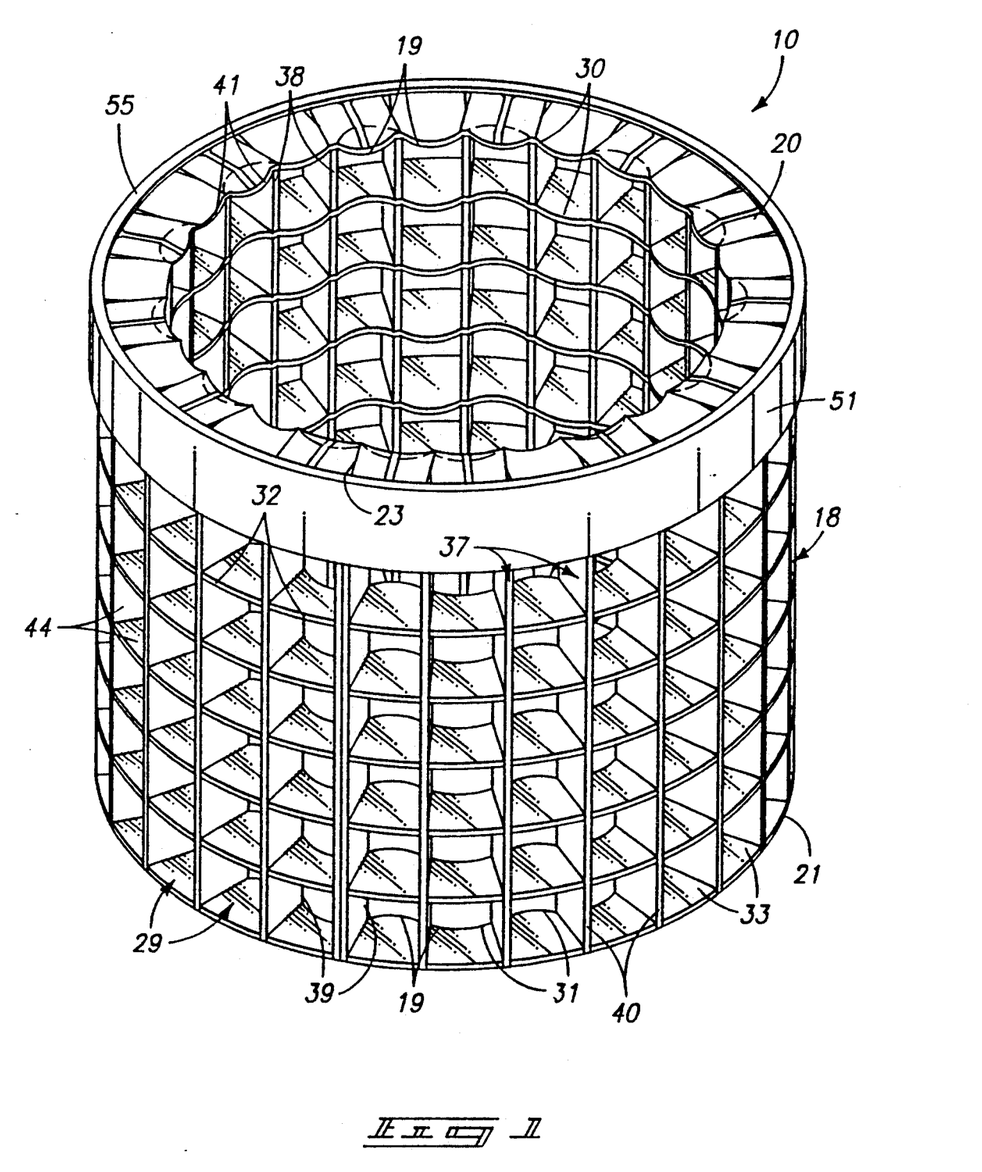
FIG. 1 is a pictorial view of a planter incorporating features of the present invention.

Grid wall 18 in the first preferred form extends about the perimeter of the planter to opposed end edges 22, which form an axial seam 23 when the wall is in its closed configuration, substantially as shown in FIG. 1. The seam 23 may be selectively closed by appropriate releasable fasteners such as wire ties (not shown) or other conventional fastener forms. It is advantageous that the seam 23 be provided so the wall is capable of being opened to permit disengagement of wall from the planting medium and any plants therein whenever desired. This feature is extremely useful after harvest or if it is desired to transplant the plant presently growing in the planter.

When opened (FIG. 4), the end edges 22 separate to enlarge and expose the internal planting chamber 26 defined by the wall. When the grid wall 18 is closed, as shown in FIG. 1, the internal surfaces of the wall define the internal open ended planting chamber 26.

Figure 2:
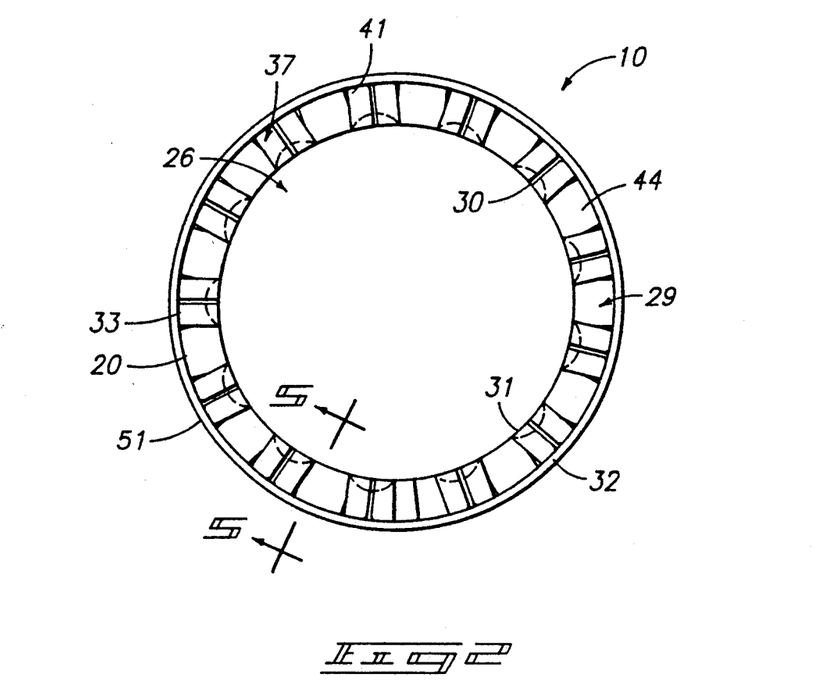
FIG. 2 is a side elevation view thereof.

As shown in FIG. 2, the planting chamber 26 is defined along an upright axis and is open at both top and bottom ends 20, 21. This is a preferred configuration. However, as indicated above, one of the ends may conceivably be closed.

In the embodiment shown in FIG. 10, the planter is horizontal, with the grid wall 18 formed in the same manner and of the same materials as shown for the first embodiment. A top opening 25 in the horizontal planter is defined by the grid wall ends 24 and upright flat container end walls 27. The walls 18, 27 are formed of open cells, as described briefly above, which may be uniform about the entire perimeter of the planter. The cells of the horizontal planter are similar to those found in the upright planter shown in FIGS. 1-9, but are preferably proportionally smaller (within the dimensional relationships disclosed below).

The grid walls 18 in both examples shown, are formed by first and second groups of strips 29, 37. The strips are substantially identical to one another and are fitted together to form the cellular grid configurations shown. Parametric strips 29 extend about the circumference, while strips 37 intersect the parametric strips 29 and extend substantially axially with respect to the central axis of the preferred planter forms.

The preferred material for construction of the present invention is metal, provided in intersecting strips and seal coated to prevent heat loss by conduction and convection. A preferred typical thickness dimension for strips is approximately 0.025 inches, though other thicknesses may be used.

The individual strips 29, 37 are provided with spaced apart transverse slits, formed approximately half way through the strip width dimensions from one side thereof. The strips are joined at the slits, with half the width of strips 29 being overlapped by half the widths of the strips 37. The joined strips form the open gridwork of cells that form the walls 18. The distance between respective slits in the panels determines the cell opening size.

Figure 11:
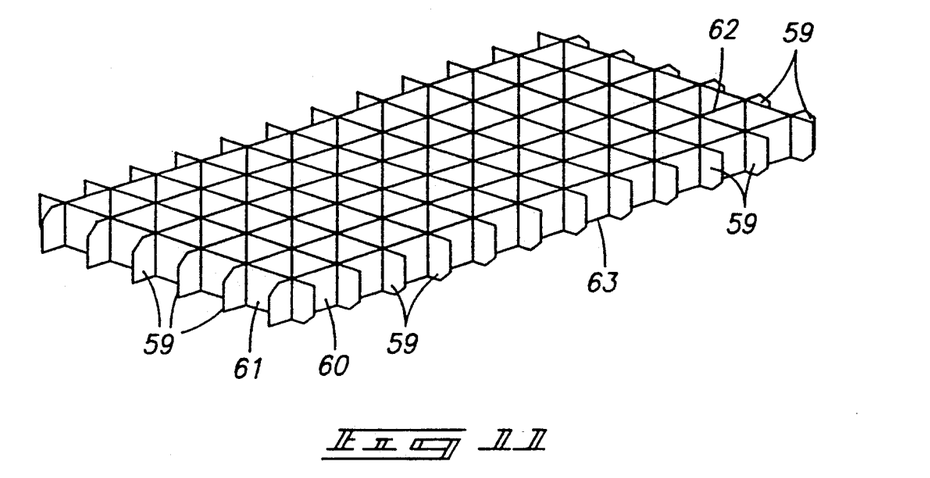
FIG. 11 is a perspective view of a flat grid panel prior to formation by the present planter construction method.

The grid walls 18 are initially provided in flat panels as shown in FIG. 11 to be bent into the particular configuration desired by the process steps described below. Grid walls 18 may be left in the flat configuration for use in rectangular container configurations (not shown) and for container end walls 27, if such walls are to be used. The panels may also be bent into a substantially cylindrical form using the unique process described below and illustrated in the drawings.

It is advantageous that the strips 29 and 37 be aluminum, with a reflective, insulative coating 44. An anodized coating is preferred due to several unique benefits. Anodizing substantially seals the aluminum (thereby reducing heat loss through convection). Anodizing also adds a heat insulative layer to the strips to reduce heat loss through conduction and convection.

The preferred anodized coating 44 is light and heat reflective. A reflective anodized coating 44 on the aluminum strips 29 and 37 will cause the temperature of the planting medium within the planting chamber 26 to rise in sunny conditions by reflecting the warming rays of the sun onto the exposed surfaces of the planting medium. The insulative nature of the coating also prevents heat loss during night time or cold overcast conditions by minimizing outward heat conduction and convection from the planting medium.

An experiment was conducted on a warm, bright day in the Northwestern United States during May, when ground temperature at 6 inches deep was 60 degrees Fahrenheit. The ambient air temperature was 65 degrees Fahrenheit. Soil within an experimental planter 10 similar to that shown in FIG. 1 at 6 inches deep was 70 degrees Fahrenheit, 10 degrees higher than the ground temperature and 5 degrees warmer than the ambient air. Such increased springtime soil temperature is beneficial to virtually any plant growth.

During the same experiment, later in the growing season when temperatures increased, it was found that the plant foliage surrounding the container tended to act as a natural mulch so "cooking the roots" did not become a problem as has been experienced with solid wall planters.

Other experimentation with a planter formed of bare aluminum strips obtained results indicating an encouraging increase in daytime planting medium temperature. However, the heat conducting and porous nature of bare aluminum was found to cause significant heat loss from the planting medium by convection and conduction during night time or in overcast, cold weather.

Anodized, reflective coatings 44 on the strips were thus found to be a solution to the heat loss problem and, in addition provided the further benefit of assisting planting medium warming during sunny hours. Such strips exhibited desired reflective properties, and reduced potentially plant damaging heat loss during cold times.

The strips 29, 37 within the two groups may be identical originally, but are inverted relative to one another prior to assembly. Thus in the planter assembly, strips of the first group 29 may be slotted along their outer edges while the strips of the second group 37 are slotted along their inner edges.

By slotting the strips to a depth just slightly less than one half their depth dimension, the intersecting strips can be forced toward one another until their respective inner and outer edges are coplanar. The resulting upset produced at the base of each slot forms a cold-welded joint, securing the strips to one another of their intersections.

Other grid structures that may be alternatively suitable for this application are disclosed in U.S. Pat. No. 4,753,219; U.S. Pat. No. 533,498; U.S. Pat. No. 3,389,451; all of which are hereby incorporated in this disclosure by reference, to the extent relating to examples of grid fabrication and grid bending techniques that may be alternatively applicable to the present disclosure. It is also understood the present wall grid may be produced by other equivalent fabrication methods and of appropriate materials.

Figure 5:
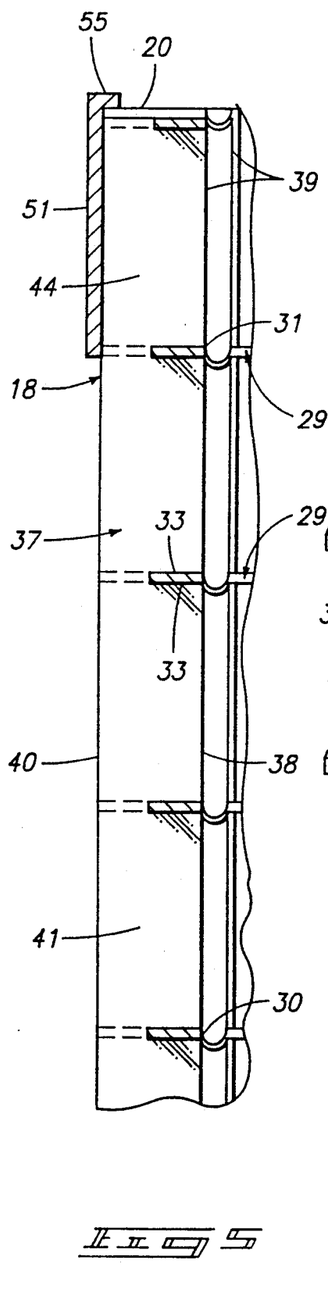
FIG. 5 is an enlarged fragmented sectional view taken along line 5—5 in FIG. 2.
Figure 6:
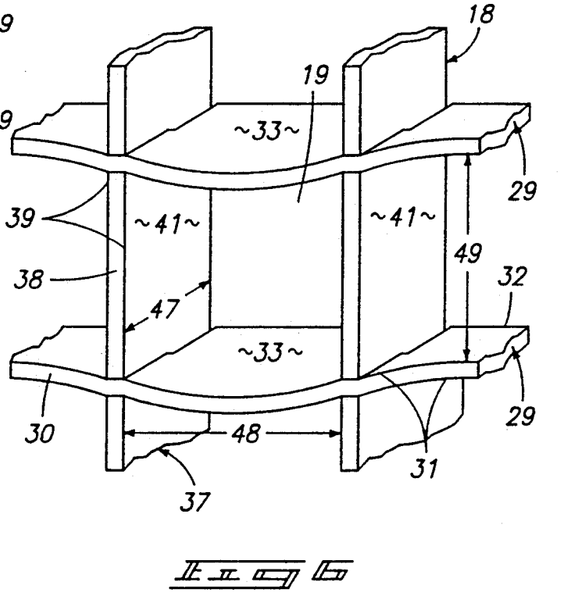
FIG. 6 is an inner pictorial view of a single cell opening of the planter wall.
Figure 7:
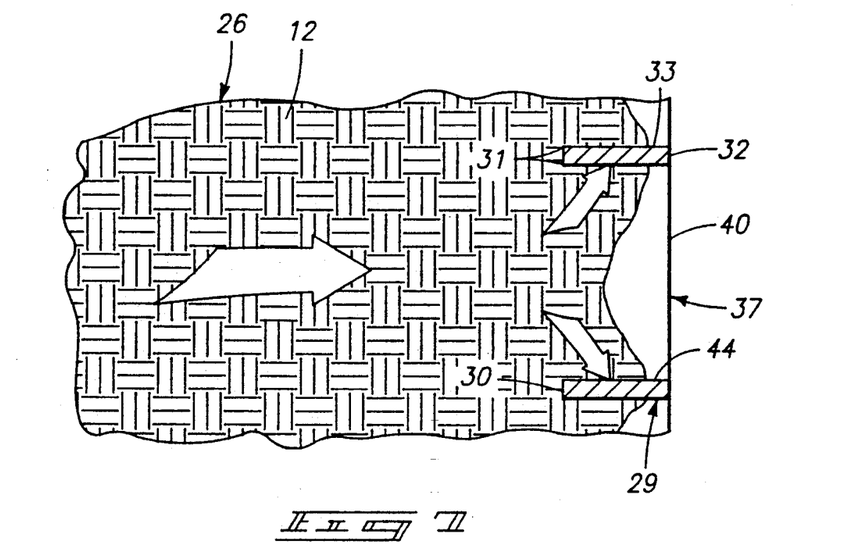
FIG. 7 is a fragmented detail view illustrating a cell configuration with a planting medium.

Referring now to FIGS. 5 and 6, (which may be considered to be representative of both upright and horizontal planter forms) it will be seen that the first group of strips 29 includes inner edges 30 and opposed outer edges 32. The edges 30 and 32 extend about the perimeter of the planter and are substantially circular, centered on the axis of the planter.

The inner edges 30 include abrupt, relatively sharp root trimming corners 31 that facilitate mechanical pruning of plant roots growing within the planter. The corners 31 may be formed by conventional stamping or forming processes.

The inner and outer edges 30, 32 are connected by opposed areal side surfaces 33. The side surfaces 33 may include angular variations due to the bent configuration of the grid wall. Such configurations are illustrated in U.S. Pat. No. 4,753,219 referred to above and incorporated as illustrative of such features.

The second group of metal strips 37 include inner edges 38 with appropriate root cutting corners 39 and radially spaced outward outer edges 40. Edges 38 and 40 are connected by opposed aerial side surfaces 41. The side surfaces 41, in the cylindrical configurations shown, are substantially perpendicular to surfaces 33 of the first group 29. However, the angular orientation of the second group of strips 37 could be otherwise. For example, it is conceivable that both groups of strips could be angularly offset to form diamond or other polygonal cell configurations.

FIG. 6 illustrates relative dimensions of the individual cells 19 that are of particular advantage in the present planters 10. Each cell includes a depth dimension 47 between the inner and outer edges (30, 32 or 38, 40). The depth dimension 47 is related to a first opening dimension 48 between second strips 37 and a second dimension 49 between the first strips 29. The dimensions 48, 49 are no more than twice that of the depth dimension 47. Restated in another manner, the depth dimension 47 is at least one half the dimensions 48, 49. This relationship is preferable for every cell within the container.

In actual practice, the upright planter configuration may include cell dimensions 48 and 49 of approximately 1.5 inches, and a depth dimension 47 of at least approximately 0.75 inches, and more preferably about 1.0 inches. These dimensions are advantageously used in planters having a minimum of approximately 5 gallon capacity. Proportionally smaller cell dimensions are used for smaller volumes.

The 1.5 inch cell size lends advantages in the ability to place plants directly into the vertical side walls of the planter, thereby substantially covering the planter with growing plants. This produces an attractive and ornamental effect, even with non-ornamental plants such as vegetables, especially when the plants reach full foliage.

Overall dimensions for the planter may vary with the plants to be grown, and simple aesthetics. However, it has been found that some specific dimensions work best for most planting situations, especially for edible plants. A planter having a height dimension (axial) within approximately 10-12 inches, and an outside diameter within about 14-17 inches has been found to be very useful for many planting needs. Within this range, planters with a height of approximately 11 inches and an outside diameter of approximately 16 inches are preferred.

The cell dimensions for the horizontal planter configuration shown in FIG. 10 are within the proportions recited above, but are reduced in scale, due to the open cell nature along the bottom area of the wall structure 18. It has been found that cell opening dimensions of 0.5 inches, and similar depth dimensions (0.5 inches) are sufficient to hold the planting medium even with the cells being vertically open at the bottom side of the planter as shown in FIG. 10. Surprisingly, open cells with uniform 0.5 inch cell dimensions have been found to hold planting medium well, even without other support.

The relationship of opening size to strip depth dimension disclosed above is important to facilitate retention of planting medium within the planters. This feature is illustrated diagrammatically in FIG. 7. As the planting medium pushes outwardly through the cell as shown by the large arrow, an equal pressure is exerted laterally against the cell walls as shown by the smaller arrows. Thus, the planting medium is retained within the planter yet the exposed surface area of the planting medium is maintained at a maximum.

With the above cell dimensional parameters and thin strip dimensions, more than 95 percent of the container wall surface is advantageously open to the air. Though this large percentage of open space is provided, no liner is required within the planters, even with the open bottom structure of the horizontal unit shown in FIG. 10. The soil will stay "set" in the cells due to the pressures referred to above and indicated by the arrows in FIG. 7.

A retainer ring 51 is illustrated in FIG. 1. The retainer ring 51 used in the upright planter form is slidably received over the upright grid wall 18 and engages the outer edges 32, 40 of the groups of intersecting metal strips. The retainer ring is dimensioned to engage and hold the grid wall 18 in the closed condition with the end edges 22 in abutment as shown in FIG. 1.

As an alternative in the upright configuration, more than one ring 51 may be used. Further, wire ties (not shown) can be used in addition to or in place of the ring or rings 51. The ties may simply be wrapped around the end edges 22 and secured to hold the planter closed.

Figure 4:
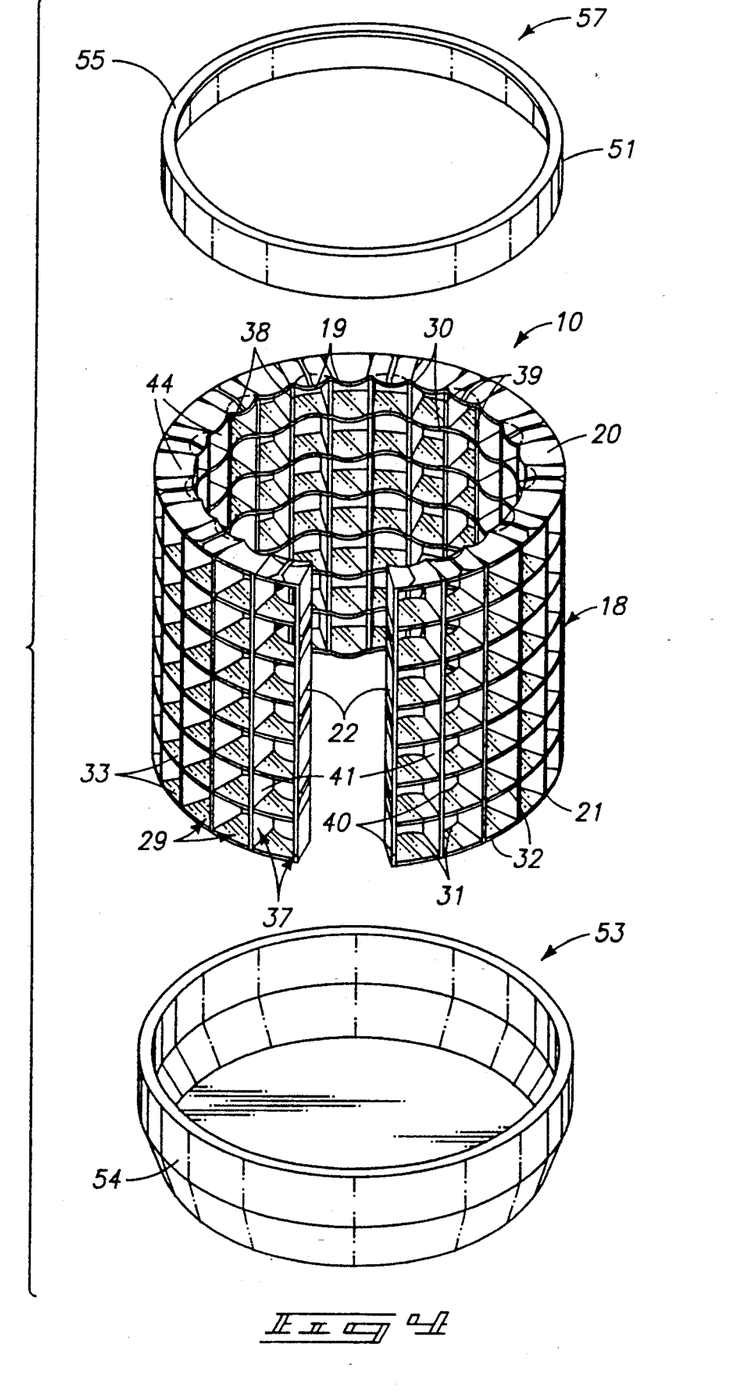
FIG. 4 is an enlarged, exploded view of the present planter, including a tray.

The planter 10 may be opened to the condition shown in the exploded view of FIG. 4 simply by sliding the ring 51 upwardly off the wall and releasing whatever additional fasteners (such as wire ties) that may be used to hold the seam 23 closed. The wall is then free to spring open, as shown. This facilitates removal of the planting medium and any plants contained within the planting chamber.

Two rings 52 are shown in FIG. 10, and, as the ring 51 described above, may be slidably mounted to the wall 18. The rings 52 are used to hold the wall in the open condition shown, and to permit further separation of the grid wall ends 24 to facilitate removal of the planting medium and any plants contained therein.

Figures 8, 9:
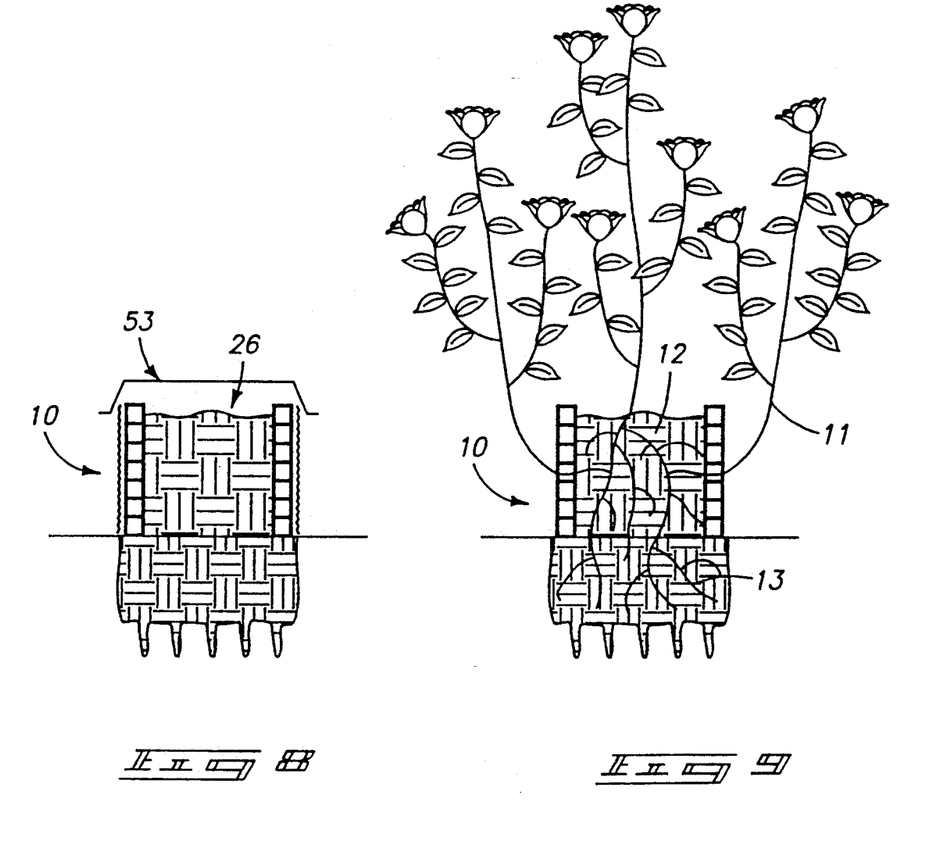
FIGS. 8 and 9 are diagrammatic sectional views illustrating use of the present planter in a fall composting condition and a summer growing condition, respectively.

Advantages are gained from the addition of a planter tray 53 to the upright planter form (FIGS. 4, 8). The planter tray 53 confines a planting medium and water applied within the assembled planter. It includes an inclined or upright peripheral wall 54 having an inside diameter slightly larger than the diameter or outer perimeter size of the grid wall 18. The tray will therefore loosely receive and support the grid wall, allowing the entire unit to be transported in a manner similar to a conventional planter.

An additional advantage is gained from the combination with the tray 53 in a fall or winter season condition as indicated in FIG. 8 where the planter is used to retain a planting medium and other vegetation for the purpose of composting. Here, the planter is used to support the materials, is covered by the tray 53, and may be surrounded by a transparent material such as clear plastic film, thereby gaining utility as a composter to effectively prepare a healthy growing site for spring.

Given the above understanding of the component parts of preferred exemplary forms of the present planter, the present process for producing the planters may now be understood.

A process for producing a first preferred form of the present planter will be described in greater detail, with reference to FIGS. 11-16. While this process is directed specifically to the first preferred form of the present planter, it should be understood that the process may also be performed, with only minor modifications, to produce the horizontal planter configuration.

The process begins with providing a flat panel formed as a grid of intersecting strips substantially as shown in FIG. 11. The grid is preferably formed of interfitting aluminum strips with the reflective anodized coating 44 as described above, with similar cell and material dimensional properties also as described above.

In order to assist further description of the present planter producing process, several features of the grid panel shown in FIG. 11 will first be described. The grid panel includes outwardly projecting tabs 59 that actually are the ends of the strips making up the grid.

The grid panel also includes side edge strips 60 and end edge strips 61 made up of the strips at the perimeter of the panel. The side edge strips 60 will be combined with the adjacent tabs 59 to eventually become the top and bottom ends 20, 21 in the first preferred form of the present planter; or the grid ends in the horizontal version (FIG. 10). The end edge strips 61 and adjacent tabs 59 will eventually become the opposed end edges 22.

The grid panel also includes a top surface 62, and a bottom surface 63 that, on completion of the planter, become the inside and outside planter wall surfaces. The surface selected to be the bottom surface 63 is determined by the orientation of the slits in the various strips. The panel is turned so the strips that are destined to become the parametric strips 29 are oriented with the slits formed therein opening downwardly. The downwardly oriented surface thus becomes the "bottom surface" 63 and eventually will become the outside grid wall surface of the planter. If the grid is not properly oriented, (with the slit openings in the parametric strips oriented downwardly) the parametric strips will bind and sometimes tear during the rolling steps described below.

Figure 12:
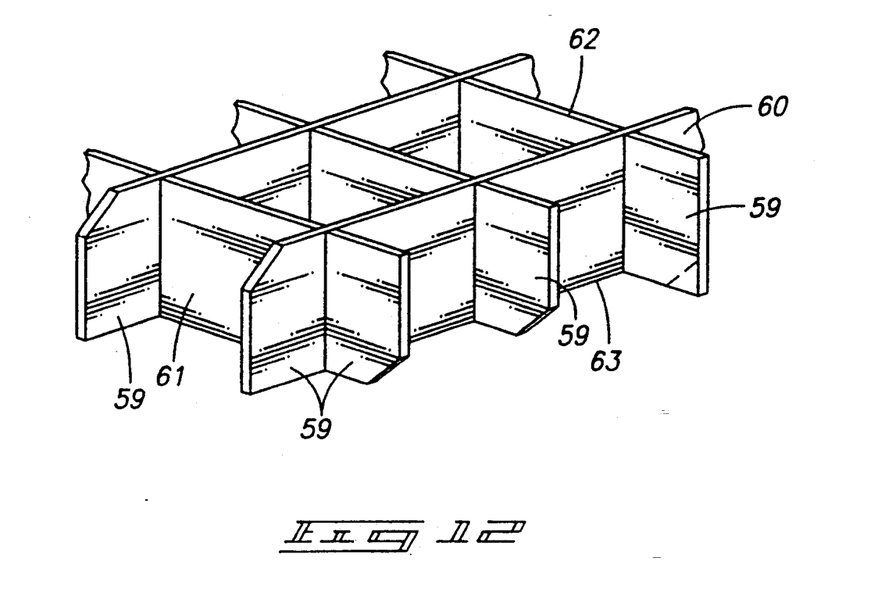
FIGS. 12-15 are diagrammatic views illustrating various steps in constructing the planter.

After note is made of the slit orientation, and the panel is turned with the bottom surface 63 down, corners of the projecting tabs 59 are trimmed as shown in FIG. 12. Only the tabs projecting from both side edge strips 60 need to be trimmed, and of those, only the corners adjacent the bottom surface 63. Corners of the tabs projecting out from the end edge strips 61 of the panel may also be trimmed, and of those only the corners adjacent the top surface 62 are trimmed. The corners thus removed would otherwise project outwardly after the rolling process, thus interfering with reception of the ring 51 and presenting a safety hazard.

Figure 13:
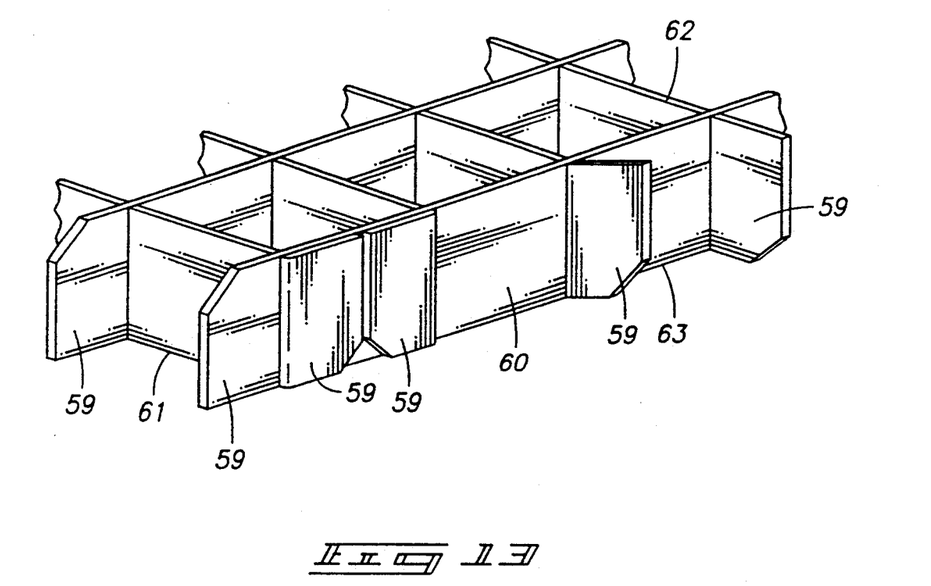

It is preferred that the tabs 59 be trimmed as described, then folded flat against the next inwardly adjacent strips in the grid so the top, bottom, and ends (forming the seam 23) are relatively flat. The tabs are preferably folded toward one another in pairs as shown in FIG. 13.

Figure 14:
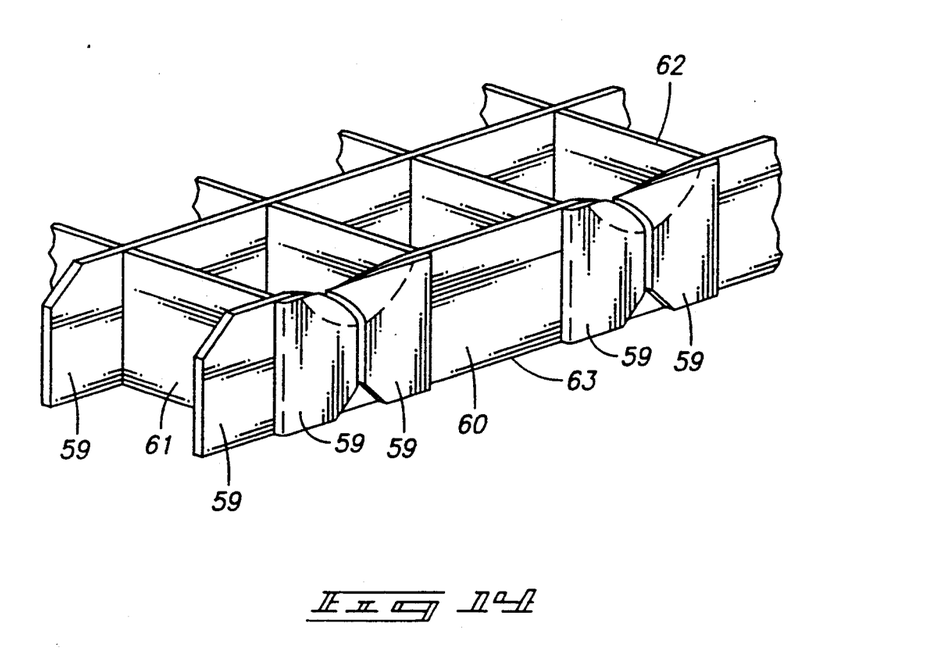
Figure 15:
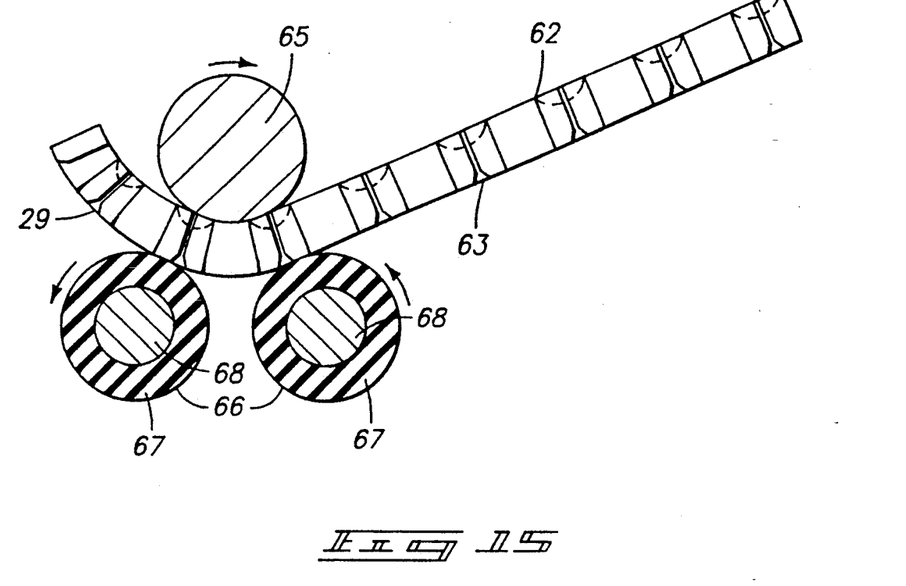
Figure 16:
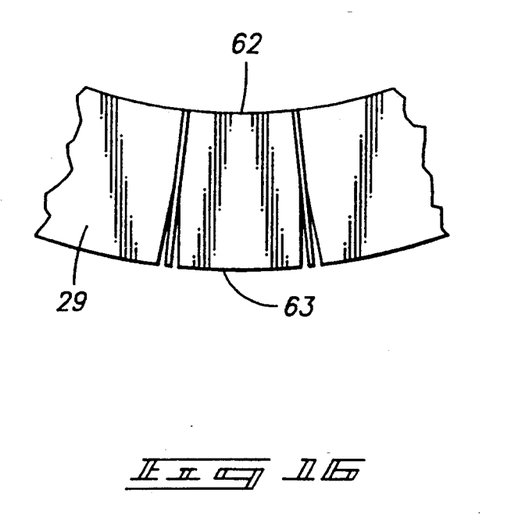
FIG. 16 is an enlarged fragmentary view of a section of the planter wall.

Next a step is performed to secure the edges of the panel to prevent separation of the strips during usage. To do this, the folded tabs are crimped along the untrimmed edges, along with the underlying adjacent strips, substantially as shown in FIG. 14. The similarly bent tabs and strips thus form a mating configuration that, due to the crimp, reinforce one another and substantially lock together to resist separation.

Figure 3:
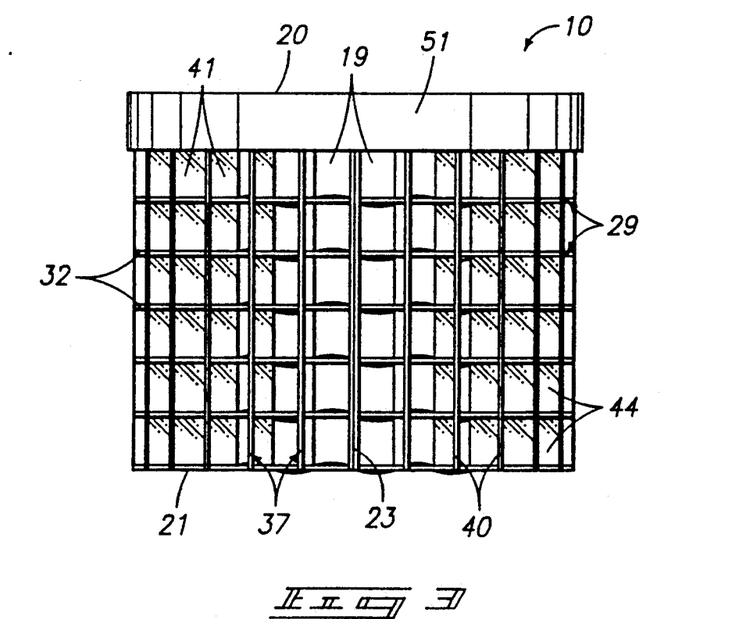
FIG. 3 is a top plan view thereof.

It is pointed out that the end edge strips 61 are not crimped as described above. They simply remain with tabs 59 folded as described above without crimping to form (along with the panel ends 61) the wall end ends 22. The ends 22 may then be positioned closely together to form the seam 23 when the planter wall is in the closed condition as shown in FIG. 3.

Next the rolling process takes place. This process step includes the use of a standard rolling machine, but with special modifications to accommodate the grid panels. The typical steel rolling former includes three steel rolls, with one upper roller 65 centered over a pair of lower steel rolls 66. The rolls are mounted for rotation on axes that may be adjusted to accommodate the workpiece panel thickness and radius of curvature.

The rolling former is modified for the present process by replacing the bottom pair of rolls with a rubber coating 67. Preferably the rubber coating 67 is "Neoprene" and has a thickness dimension of approximately 0.5 inches on steel cores. The softer material, backed by steel internal cores 68 accomplishes the bending function without damaging the grid panels.

Thus the step of bending the panels is accomplished by passing the panels through the rotating bending rolls. The outer or bottom surfaces 63 of the panels (that will eventually form the outside surface of the planter walls) is pressed against the soft rubber coating 67. The top surfaces 62 (that will eventually form the inside surface of the planter walls) are held against the top steel roll 65 between the rubber coated rolls below. The top roll 65 engages the top panel surface substantially simultaneously as the rubber lined rolls engage the bottom panel surfaces. Together, the rolls form the panels into a curved configuration of a desired radius. This step is diagrammatically shown in FIG. 15.

It should be noted that the rolling former is conventional in structure and operation, with the exception of the rubber coated rolls. Specific details of the former will therefore not be discussed further for purposes of brevity.

On completion of the rolling step, the panel will have developed a substantially cylindrical configuration, with the end edges 22 spaced apart slightly, as shown in FIG. 4. Thus the rolling step substantially finishes the construction steps involving the grid wall.

The ring 51 may be formed independently of the wall, using similar rolling techniques, but not requiring the soft rubber rollers. The ring is formed with an inwardly projecting flange 55 which will rest on the top edge of the formed wall. It is formed of a strip of material, bent into a circular shape with a diameter just slightly larger than the exterior diameter of the cylindrical wall, and so will be slidably received over the wall as shown in FIG. 1. Ends of the strips forming the rings are preferably secured together by conventional fasteners such as rivets or spot welding to complete the ring configurations. The rings may be formed of anodized aluminum of heavier gauge than that of the grid strips.

The planter tray 53 may be provided in a commercial, off-the-shelf configuration, or may be formed, preferably of plastic, with specific dimensions to accommodate the planter walls using standard thermoforming or injection molding techniques.

Completion of the planter, including the retainer ring and receiving tray simply includes the steps of placing the ring over the top end of the formed wall, with the end edges 22 held in abutment. The ring 51 will function to hold the wall closed and cover the otherwise exposed edges of the strips at the top of the planter. The planter may then, if so desired, be placed in the tray 53. It should be noted, however that placement in the tray is optional, and that there will certainly be situations where it is desirable for the planter wall to be placed directly onto the ground surface.

The process steps involved in producing the second preferred form of the present planter are substantially similar to those described above, with the added step of securing end grids to the substantially cylindrical, horizontal wall ends as shown in FIG. 10. The grids may be removably attached by first securing them to rings 52 which are removably received over the ends of the wall. The grids may be secured by means of common fasteners (not shown) such as rivets, spot welding, etc. to the rings 52.

Steps included in the present planting process using the above described planter include several basic steps. First, a planting medium is placed within the planting chamber against the inner edges of the grid. The planting medium is retained by the open cells, and is exposed to ambient air and reflected light and heat from the strips through the open cells. Next, a plant or seed is placed within the planting medium. The plant and soil are then cultivated in the usual manner by watering and weeding, if needed, to promote growth.

The roots of the plant growing in planting medium placed within the planting chamber will be mechanically pruned by physical contact with the inner strip edges, and air pruned by exposure to open air through the open cells.

FIG. 9 indicates a growing plant in the present planter 10, positioned against a ground surface. This is a preferred growing situation for placement of the planter directly on prepared ground surface which may be prepared with a layer approximately 10 inches deep of composted soil. This permits drainage and allows the plant roots to eventually extend down into the soil. However, it is noted the planter 10 remains above the ground surface.

The present planter facilitates free exchange of gasses between ambient air and the root system of the plant. Carbon dioxide will cling to the root tips of the plant. As the plant is watered, oxygen-bearing moisture flushes the area around the roots. In a conventional solid-walled container or the ground surface, the carbon dioxide must work its way upward to escape. With the present planter, the carbon dioxide is allowed to escape both upwardly and outwardly through the open cell structure. This in effect allows the soil to "breathe".

As the plants grow within the present planter 10, roots will encounter the sharp, abrupt cellular wall sections. The sharp corners 31, 39 mechanically prune the roots and thereby further assist to prevent spiral root growth.

In addition, any roots that will clear the strips and that would otherwise project out through the open cells will come into direct contact with air and will stop growing. These roots are thereby said to be "air pruned" to stop growth.

The result of these pruning processes is that many hundreds of secondary or auxiliary roots are sprouted within the planter. These secondary roots take up nutrients and promote more and better plant life. Since roots only take up nutrients in the first 2 millimeters of the root tip, it is extremely advantageous to sprout many small roots in the planter. This planter accomplishes this purpose plus gives the added advantage of mechanical pruning as identified above.

Planters 10 have been inspected after a growing season without evidence of spiral root growth and with evidence of hundreds of small, dense, matted, hair-like roots within the container's soil.

At the end of the growing season, dead vegetation grown in the planter walls may be cut away and the retainer rings 51, 52 or wire ties are removed, allowing the wall to spring to an open condition. This permits access to the planting medium inside the planting chamber 26 to facilitate removal. If the roots are found within the cells, the wall may be pulled apart or opened substantially radially until the inner surfaces clear the root mass. The wall is then lifted away. The resilient nature of the metal grid then allows the wall to return to the desired condition for further use.

In compliance with the statute, the invention has been described in language more or less specific as to methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A planter, comprising:
   a grid panel including first and second groups of strips with interfitting slits spaced along the lengths thereof and with the slits on one group of strips opening on a prescribed side of the panel and including tabs formed of strip ends projecting outwardly of side and end edges of the panel;
   the tabs being folded against the side and end edges;
   the folded tabs and adjacent side edges being crimped at locations along the grid panel along a side thereof opposite the prescribed side;
   the panel being bent in a partial cylindrical configuration by passing the panel between a pair of yieldable bending rolls and a solid bending roll, with the prescribed side against the pair of yieldable bending rolls and the panel side opposite the prescribed side against the solid bending roll; and
   a ring removably received about the prescribed side to hold the end edges together in a substantially cylindrical configuration.

2. A process for producing a planter, comprising the steps of:
   providing a grid panel including first and second groups of strips with interfitting slits spaced along the lengths thereof and with the slits on one group of strips opening on a prescribed side of the panel and including tabs formed of strip ends projecting outwardly of side and end edges of the panel;
   folding the tabs against the side and end edges;
   crimping the folded tabs and adjacent side edges at locations along the grid panel along a side thereof opposite the prescribed side;
   yieldably engaging the prescribed side against a pair of yieldable bending rolls and the panel side opposite the prescribed side against a solid bending roll;
   bending the panel between the bending rolls into a partial cylindrical configuration; and
   placing a ring about the prescribed side to hold the end edges together in a substantially cylindrical configuration.

3. A process as claimed by claim 2, comprising the further step of:
   trimming portions of the tabs at corners thereof along the side edges adjacent the prescribed side of the panel prior to the step of folding the tabs.

4. A process as claimed by claim 2, wherein the step of folding the tabs is accomplished by folding the tabs in pairs toward one another against the side and end edges.

* * * * *